United States Patent [19]
Arel et al.

[11] Patent Number: 5,897,293
[45] Date of Patent: Apr. 27, 1999

[54] COUNTERWEIGHTED PROPELLER CONTROL SYSTEM

[75] Inventors: David Arel, Granby; Robert Perkinson, Enfield; Charles DeGeorge, Suffield, all of Conn.

[73] Assignee: United Technologies Corporation, Windsor Locks, Conn.

[21] Appl. No.: 08/753,229

[22] Filed: Nov. 22, 1996

[51] Int. Cl.$^6$ ............................................. B63H 3/00
[52] U.S. Cl. .............................. 416/46; 416/44; 416/46; 416/47; 416/48; 416/49; 416/50; 416/51; 416/114; 416/157 R
[58] Field of Search ............................ 416/31, 44, 46, 416/47, 48, 49, 50, 51, 157, 37, 114

[56] References Cited

U.S. PATENT DOCUMENTS

| | | | |
|---|---|---|---|
| 4,523,891 | 6/1985 | Schwartz et al. | 416/157 R |
| 4,588,354 | 5/1986 | Duchesneau et al. | 416/27 |
| 4,750,862 | 6/1988 | Barnes et al. | 416/46 |
| 4,899,641 | 2/1990 | Khan | 416/114 |
| 5,037,271 | 8/1991 | Duchesneau et al. | 416/47 |
| 5,042,966 | 8/1991 | Schwartz et al. | 416/47 |
| 5,174,718 | 12/1992 | Lampeter et al. | 416/48 |
| 5,186,608 | 2/1993 | Bagge | 416/37 |

FOREIGN PATENT DOCUMENTS

0311277A2  10/1987  European Pat. Off. .
0409552A2   1/1991  European Pat. Off. .

*Primary Examiner*—Thomas E. Denion
*Assistant Examiner*—Ninh Nguyen

[57] ABSTRACT

A system for controlling functions of a propeller having a plurality of blades is disclosed. The system comprises an electronic control for controlling the functions of the propeller. A plurality of backup devices are provided for backing up the electronic control upon the occurrence of conditions. These conditions include at least one of testing, manual override, and a malfunction in the electronic control causing at least one of the functions to endanger safety. The system further includes a bypass device for bypassing the electronic control and for invoking at least one of the plurality of backup devices to acquire control over at least one of the functions. The bypass devices include a mechanism for determining the occurrence of at least one of the conditions and for actuating electronic control override.

11 Claims, 1 Drawing Sheet

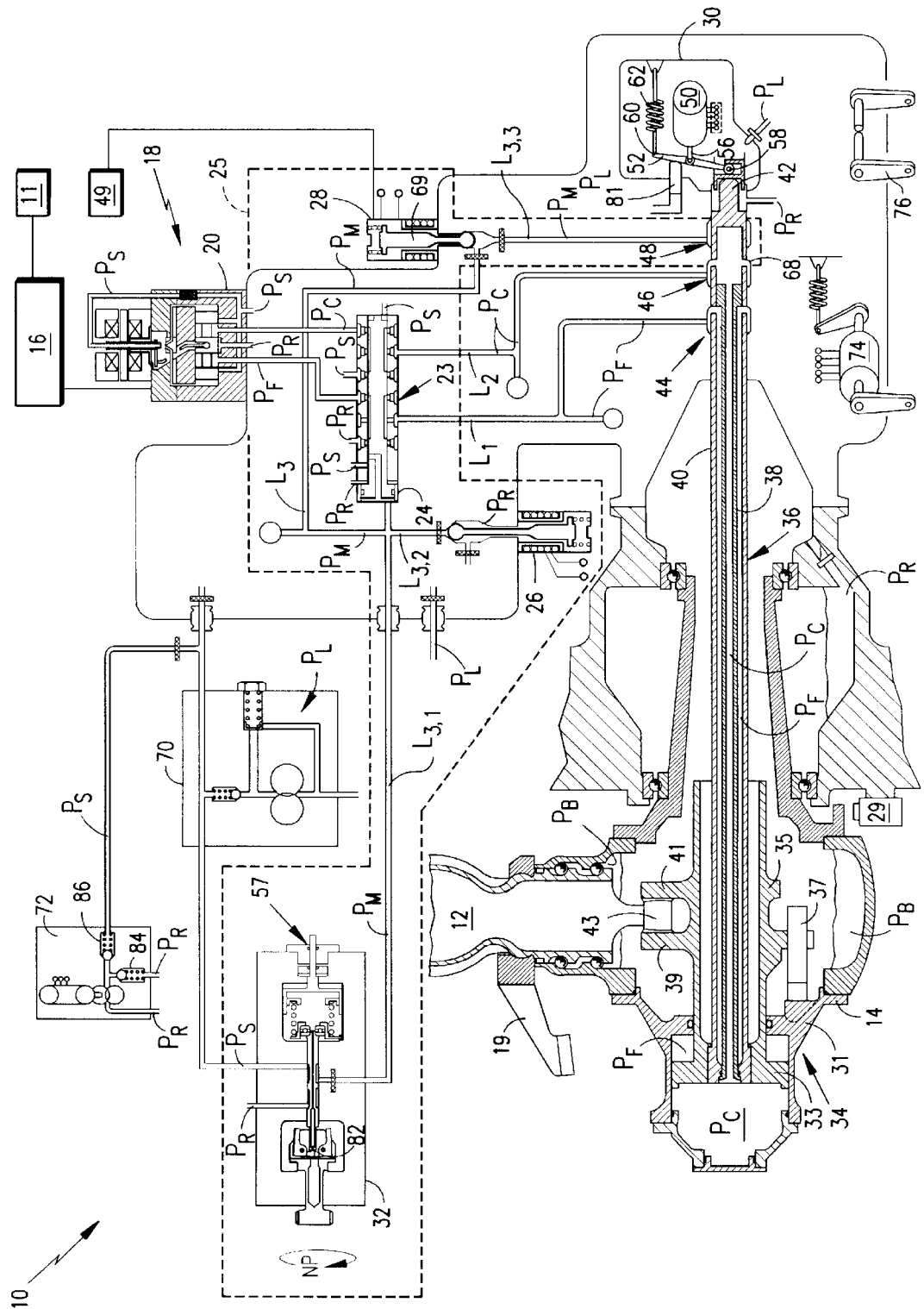

COUNTERWEIGHTED PROPELLER CONTROL SYSTEM

TECHNICAL FIELD

This invention is directed to propellers, and more particularly, to an electronic system with a backup system for controlling and monitoring propeller blade functions, and specifically blade angle changes.

BACKGROUND ART

Variable pitch propeller systems incorporate mechanisms to protect the systems against uncommanded blade angle excursions towards low pitch or low blade angle, typically in the event of hydraulic failure. Propeller designs which use counterweighted blades also allow for the use of a simple pitch change actuator. Accordingly, hydraulic pressure required to adjust propeller blade pitch or angle may be supplied directly to the coarse pitch and fine pitch chambers of the pitch change actuator usually found in such systems, on command from a propeller control.

An electronic control system is typically operable to control and monitor blade angle thereby changing blade angle as demanded by flight conditions. In the typical case, such commands are implemented by an electronically operated valve which directs and cuts off hydraulic fluid to the coarse and fine pitch chambers of the pitch change actuator.

In the event that there is an electronic failure within the propeller control system or loss of aircraft electrical power, a backup system must be deployed, which system is typically mechanical, to monitor, control and adjust the pitch change actuator for adjusting blade angle in accordance with flight conditions. In this manner, electronic malfunctions which could cause blade angle to send the propeller into overspeed conditions and high negative thrust can be avoided.

In currently available electronic propeller control systems, with mechanical backups, the overall system size and complexity can be problematic with regard to important weight and cost considerations.

There exists a need, therefore, for an electronic propeller control system with a mechanical backup which is reliable and provides due consideration to weight and complexity for increasing flight efficiency and decreased costs, respectively.

DISCLOSURE OF INVENTION

The primary object of this invention is to provide an improved electronic propeller control system having a simplified mechanical backup system for monitoring, controlling and changing the propeller blade angle.

Another object of this invention is to provide an electronic propeller control system with a backup system for use with counterweighted type propeller blades, wherein the system includes a single simplified protection valve which is operative to control various backup system features.

Still another object of this invention is to provide an electronic propeller control system having a backup system incorporated in a lighter and lower cost hydromechanical unit.

And yet another object of this invention is to provide an electronic propeller control system having a backup system, wherein the control system includes means for automatically checking the functionality of the mechanical system.

The objects and advantages set forth herein are achieved by the system of the present invention for controlling functions of a propeller having a plurality of blades. The system comprises an electronic control for controlling the functions of the propeller. A plurality of backup devices are provided for backing up the electronic control upon the occurrence of conditions. These conditions include at least one of testing, manual override, and a malfunction in the electronic control causing at least one of the functions to endanger safety. The system further includes a bypass device for bypassing the electronic control and for invoking at least one of the plurality of backup devices to acquire control over at least one of the functions. The bypass devices include a mechanism for determining the occurrence of at least one of the conditions and for actuating electronic control override.

BRIEF DESCRIPTION OF THE DRAWINGS

The only FIGURE is a schematic view of the propeller control system of the present invention, including an electronic control and mechanical backup system, controlled by a single protection valve.

BEST MODE FOR CARRYING OUT THE INVENTION

Referring now to the drawing in detail, there is shown in the FIGURE an electronic/hydraulic propeller control system, designated generally as 10. System 10 is used to monitor and change blade pitch angles of counterweighted blades 12 to a desired in-flight blade angle, mounted as known in the art, to propeller hub 14, as shown in the FIGURE. System 10 generally includes an electronic control 16 and a hydromechanical portion 18. Portion 18 generally includes control valve 20, used by control 16, a protection valve 24 also used in part by control 16, a mechanical backup system 25, as indicated by the dotted lines, including protection valve 24, a feather solenoid 26, a secondary low pitch stop system 28, and an overspeed governor 32. A beta angle feedback sensing system 30, pitch change actuator 34, and transfer tube 36 are also provided. Additional elements are included in both the electronic and hydromechanical system portions, which elements are discussed in detail below.

Hydraulic pressure, for actuating the various mechanism disclosed herein, is indicated generally in the FIGURE by the darkened lines and is designated more specifically in the FIGURE and throughout the text by the $P_{subscript}$ designations, wherein $P_S$ is supply pressure, $P_C$ is coarse pitch change pressure, $P_F$ is fine pitch change pressure, $P_L$ is lube pressure, $P_R$ is return pressure, $P_B$ is barrel lube pressure, and $P_M$ is mechanical backup system pressure.

Electronic control 16 preferably includes interfaces to integrate the same with other aircraft systems. Accordingly, a communication link between control 16 and the other aircraft systems in a known manner is provided via an electronic engine control system so that control 16 can gather flight data for controlling the propeller and communicate with these other aircraft systems. Accordingly, as information is gathered via this link, blade angles can be adjusted to comply with specific flight conditions, in accordance with the system as described herein.

Electronic control systems, such as control 16, have been implemented as control systems for achieving more accurate control over blade angle monitoring, control and change. Accordingly, electronic control 16 functions with control valve 20, through protection valve 24 for controlling the metering of hydraulic fluid $P_F$ and $P_C$ to and from actuator 34 for both fine, i.e. low pitch, and coarse, i.e. high pitch, control and adjustment of the pitch angle of propeller blades 12. Preferably, electronic propeller control 16 is a dual channel microprocessor based unit, having a primary channel and a backup channel, which provides closed loop control of the pitch of propeller blades 12. The control 16 functions to control speed governing, synchrophasing, beta control, feathering and unfeathering. In addition to these functions, the unit will detect, isolate and accommodate control system faults. An example of a controller which may be used in control 16 for achieving the aforementioned functions, is EPC 100-1, manufactured by Hamilton Standard, a division of United Technologies Corporation, the assignee of the present invention The control 16 is preferably programmed in a known manner to perform the functions as set forth above. Electronic propeller control 16 is connected and in communication with control valve 20. Accordingly, control 16 is operational to send electronic signals to valve 20 for initiating and maintaining hydraulic fluid metering for operating actuator 34, described in detail below.

Electronic control 16 also controls propeller RPM wherein a governing RPM is selected from one of preferably four values stored in software provided in control 16. Control 16 will compare sensed propeller RPM to the selected governing RPM and to correct any diversion from the governing RPM, control 16 will calculate and invoke a pitch change in blades 12 by way of an electrohydraulic valve 20. Accordingly, when multiple propellers of a multiple propeller aircraft have stabilized at a selected governing RPM, synchrophaser control is initiated. A control 16 is provided for each of the propellers in the multi propeller system and in accordance with known means, a master and slave arrangement is provided for controlling RPM differentials between the propellers. That is, small changes will be made to the reference speed of the slave propeller, whichever is selected, to achieve a constant phase relationship with the master propeller.

Electronic control 16 is designed to automatically compensate for any single or any combination of faults that may be experienced thereby. Accordingly, a pilot will be advised of a fault that occurs in control 16 via signals controlled by control 16. Any combination of faults that would disable both channels of control 16 are accommodated by backup system 25, and specifically overspeed governor 32 and secondary low pitch stop system 28. Accordingly, the safe completion of flight is allowed regardless of the faults. Fault accommodation by control 16 includes the automatic transfer of control to the backup channel thereof if certain faults are detected by the primary channel here of or in of any of the electromechanical device control interfaces with. The accommodations further includes the automatic reinitialization of a primary channel when confrontational faults are detected, and restoration of control by the primary channel when health is restored. And finally, accommodation includes the automatic reversion to alternate control modes when signals required for operation in normal control modes are not available to either channel.

Control valve 20 is preferably in the form of an electrohydraulic, four-way jet pipe, servo valve, as known in the art, that controls blade pitch rate by metering hydraulic flow to actuator 34. The flow of hydraulic pressure $P_F$, $P_C$ supplied via electrohydraulic valve 20 is proportional to a milliamp electrical signal received from control 16 over at least one of its two independent electrical channels, after control 16 has communicated with the other aircraft systems to determine the appropriate blade angle of the propeller. Valve 20 has two independent electrical channels for communication with the two electrical channels of control 16. The design of electrohydraulic valve 20 is known in the art.

An example of feedback that control 16 receives from other aircraft systems is the propeller speed feedback provided by sensors 29, positioned near blades 12 for providing blade speed data. Sensors 29 are preferably in the form of magnetic speed pickups although other sensing devices may be utilized. The pickups are adapted to be placed behind blades 12 for sensing and providing propeller speed to each channel of electronic control 16. Also, a single coil pickup provides a remote propeller speed signal to the primary channel of control 16, to facilitate synchrophasing.

As indicated, protection valve 24 is associated with portion 18. In one mode, it is operable to direct hydraulic fluid hydraulic pressure $P_F$, $P_C$ from control valve 20 to transfer tube 36 for use with actuator 34 for adjusting blade angle. Protection valve 24 is preferably in the form of a spool valve, as known in the art, although other types of valves may be utilized, having a plurality of channels 23 through which hydraulic pressure is ported. Hydraulic fluid flows from electrohydraulic valve 20 of electronic control 16 through protection valve 24. Protection valve 24 allows system 25 to backup electronic control 16 by allowing the same to assume pitch change control authority from control 16, and valve 20, after the occurrence of an electronic malfunction, or other condition such as a testing routine or manual override. As indicated in the figure, coarse pitch hydraulic pressure $P_C$ originates from valve 20 in line $L_2$ and continues in line $L_2$ to transfer tube 36 for use in controlling the pitch angle of blades 12 toward high pitch. Also, fine pitch hydraulic pressure $P_F$ flows through line $L_1$ through protection valve 24 to transfer tube 38, as shown in the figure, for controlling the pitch angle of the blades toward low pitch. Accordingly, in the electronic mode, protection valve 24 is aligned with electrohydraulic valve 20 for allowing hydraulic fluid flow through lines $L_1$ and $L_2$ for fine and coarse blade pitch angle adjustment, respectively, as commanded by control 16.

In the event that electronic control 16 fails, is manually overridden, or a testing routine is implemented, protection valve 24 is operative to reposition to a protection position and cut off flow pressure $P_F$, $P_C$ as supplied from valve 20 and through lines $L_1$ and $L_2$. That is, hydraulic pressure $P_M$ is drained from valve 24 through a combination of lines $L_3$, $L_{3,1}$, $L_{3,2}$, $L_{3,3}$, of the system 25 for invoking a valve shift. In general, as valve 24 is actuated for placing one of the backups in command, supply hydraulic pressure $P_S$ is connected with line $L_2$ for providing pressure $P_C$ to the coarse (high) side of actuator piston 33 (described below) and the fine (low) pitch side of piston 33 is ported to drain. Actuation of the blades to a coarser pitch is thereby achieved.

Supplemental to backup system 25, counterweighted blades 12 prevent an overspeed or the minimum in-flight blade angle from being violated due to main and/or auxiliary pump failure, as opposed to control 16 malfunction. That is, counterweights 19 are provided on each blade 12 to provide centrifugal twisting moments about the blade axis toward increased pitch. Accordingly, if the main hydraulic and/or the auxiliary pumps fail, blades 12 are still prevented, decreasing pitch sufficiently to cause a propeller overspeed or from violating the minimum in-flight angle.

Both electronic control 16, in combination with valve 20, and system 25, through valve 24, are capable of controlling actuator 34 via hydraulic fluid flow through transfer tube 36. Pitch change actuator 34 is preferably a linear dual acting hydraulic actuator, although other designs may be utilized, which provides the force required to react to flight loads acting on the blades and to affect changes in blade pitch angle. The primary components of the actuator are the dome 31, piston 33, yoke shaft 35, anti-rotation arm 37, forward yoke plate 39, and aft yoke plate 41. Dome 31 is the pressure vessel which contains the coarse hydraulic pressure, $P_C$, and fine hydraulic pressure $P_F$. The differential between coarse and fine pressures acts across piston 33 to generate the force required to change blade pitch. Piston 33 is attached to the yoke shaft 35 and translates fore and aft with the shaft as hydraulic pressure is metered to the coarse and fine pitch sides of the piston 33 by the propeller control system. The fore and aft yoke plates 39 and 41 are attached to the yoke shaft 35. These plates 39 and 41 allow the actuator to engage trunnions 43 of propeller blades 12. Since the trunnions are offset from the pitch change axis of the blades 12, the linear motion of the actuator 34 is converted to rotation of the blades about their pitch change axis. Anti-rotation arm 37 acts to prevent the piston, yoke shaft and yoke plates from rotating, which could cause the blade trunnions 43 from disengaging from the yoke plates 39 and 41.

Transfer tube 36 is preferably comprised of two tubes 38 and 40. Inner tube 38 preferably receives hydraulic pressure $P_C$ for controlling coarse blade angle changes of blades 12. Outer concentric tube 40 is adapted to receive hydraulic pressure $P_F$ from the electrical and mechanical systems for controlling fine blade angle changes. At end 42 of transfer tube 36, a transfer bearing 68 is provided for transmitting $P_C$ and $P_F$ through windows 44, 46 and 48 from lines $L_1$, $L_2$, and $L_{3,3}$, respectively. Orifice 48 is used to drain fluid under pressure $P_M$ from line $L_{3,3}$, for causing a shift in valve 24 to the protection position, as a part of low pitch stop mechanism 28. Transfer tube 36 is rotatable with the propeller assembly and is also translatable fore and aft with the yoke shaft 35 during blade angle adjustment. The translatory motion of transfer tube 36 is used by beta angle feedback sensing system 30 to determine blade angle for use by electronic control 16, as described in detail below.

Blade angle sensing system 30 is in electrical communication with electronic control 16 for providing constant updates on the blade angles of the various blades 12 comprising the propeller. Electronic control 16 uses this data from system 30 to determine when to activate electrohydraulic valve 20, for coarsely adjusting blade angle toward higher pitch or finely adjusting blade angle toward lower pitch via the metering of hydraulic fluid through transfer tube 36 to actuator 34. The blade angle feedback system includes a rotary variable differential transformer (RVDT) 50 and a lever 52 which, in combination, sense position of the transfer tube, from which blade angle of blades 12 is calculated. An RVDT is used as opposed to an LVDT thereby allowing for a shorter envelope or volume occupied by system 30 and accordingly, by hydromechanical portion 18. Accordingly, weight and space is saved. RVDT 50 and lever 52 are mounted adjacent end 42 of transfer tube 36. As indicated in the FIGURE, lever 52 is pivotably mounted to a shaft 56 extending from RDVT 50. One end 58 of the lever is positioned for engagement with end 42 of transfer tube 36 and the other end 60 is attached to a statically mounted spring 62, and engaged with hydraulic piston 81, which provides resistance to lever 52 against end 42 of transfer tube 36. As the axial position of shaft 35 of actuator 34 is changed, transfer tube 36 is moved therewith. Accordingly, lever 52 pivoted on shaft 56 senses the axial movement of transfer tube 36 and RVDT 50 uses the sensed axial movement for determining blade angle, which is then forwarded as an electrical signal of actuator position to electronic control 16.

Mechanical overspeed governor 32 is also used as a backup device in system 25 and is in fluid communication with protection valve 24. The overspeed governor is preferably a fly weight actuated, metering valve, which, when invoked, modulates flow of hydraulic fluid at pressure $P_M$ from the reference pressure side of the protection valve 24. The flow rate is proportionate to the differential between the reference speed of the governor and the propeller speed, as sensed by flyweights 82 of the overspeed governor, which flyweights are used to determine and initiate actuation of the governor. Preferably, the overspeed governor incorporates a solenoid valve 57 to be energized by electrical power from the aircraft interface to increase the governor reference speed for landing transients. The specific design of the governor is known in the art and accordingly is not further described here. However, the overspeed governor is connected to protection valve 24 such that in the event of a malfunction in electronic control 16 which causes blades 12 to reach an overspeed condition, such as too fine a pitch angle, governor 32 assumes control upon sensing overspeed by flyweights 82, for limiting such overspeed by adjusting pitch angle in the coarse direction. That is, if a malfunction in the control 16 results in an inadvertent command of blade angle such that overspeed is reached, the mechanical backup system 25, and specifically overspeed governor 32, acts to override control 16 and coarsely adjust blade angle by assuming pressure control through line $L_{3,1}$ as protection valve 24 blocks flow from electrohydraulic valve 20. Accordingly, governor 32 meters hydraulic pressure $P_M$ to drain, causing valve 24 to shift and port supply pressure $P_S$ to the coarse pitch side of the actuator piston 33 as fluid pressure $P_C$, through line L2, as fine pitch fluid pressure $P_F$ is drained. Pressure $P_M$ from the protection valve is metered by overspeed governor 32 through line $L_{3,1}$ for coarse pitch adjustment until the overspeed condition is averted. Blade angle is thereby adjusted through actuator 34 by way of transfer tube 36.

A test of the overspeed governor may be performed on ground prior to flight. A pilot activatable switch 11, shown schematically, is preferably provided in the cockpit for sending a discrete signal directly to control 16, causing control 16 to adjust blade angle and send the propeller into overspeed Accordingly, overspeed governor 32 will be monitored to determine if it properly assumes RPM control from control 16. The switch will be operational only on ground and will be automatically deactivated via control 16 during flight conditions.

Secondary low pitch stop system includes metering orifice 48 and retraction solenoid 69, which assume flow control from the electrohydraulic valve 20 when the solenoid is in the normally open position and the minimum in-flight angle is breached. Similar to overspeed and the overspeed governor, when the electronic propeller control 16 fails to enforce the minimum in-flight blade angle, control to enforce the minimum blade angle is switched to low pitch stop system 28. In this manner, transfer tube 36 translates to a position indicative of minimum in-flight angle violation, and thereby uncovers the secondary low pitch stop orifice 48 in the transfer bearing 68, for initializing actuation of system 28. Hydraulic pressure $P_M$ is drained through orifice 48, causing a pressure differential in valve 24 and a subsequent shift to the protected position. The spool of protection valve 24 is shuttled left toward the protection position, where flow is blocked from valve 20. Line $L_1$ is drained and supply pressure $P_S$ is metered to line $L_2$ as pressure $P_C$ to actuator 34. Blade angle is thereby coarsely adjusted using actuator 34 away from the minimum in-flight angle until the blades reach a steady state position.

The secondary low pitch stop system 28 may be tested with the propeller unfeathered on the ground by electronic propeller control 16. That is, to run a test, control 16 will automatically depower the solenoid 69 of system 28 to the open position, enabling the stop, and command blade angle below the minimum in flight setting. At this time, The secondary low pitch stop mechanism 28 will override the command from electronic control 16, enforcing the minimum in-flight blade angle. Control 16 will then employ sensing system 30 to determine if the blade angle being maintained by the secondary low pitch stop system 28 is the desired minimum in-flight blade angle, thereby checking the accuracy of system 28.

Since solenoid 69 is in the open position during actuation of the low pitch stop system, control 16 may reverse blades 12 by having solenoid 69 powered closed, thereby closing line $L_{3,3}$ from line $L_3$ and protection valve 24, and deactivating stop system 28. Blades 12 may then be moved through the minimum in-flight blade angle to reverse and ground range operation positions, without control 16 and valve 20 being cut-off and backed up. Preferably, a cabin positioned switch 49, shown schematically, is provided for deactivating the solenoid. The switch is automatically deactivated for in-flight conditions.

Feather solenoid 26 is the last backup device of system 10. The feather solenoid is energizable by an electric signal from a discrete source, preferably a manual override switch, for draining hydraulic pressure $P_M$ from the metered pressure side of protection valve 24, to rapidly command blade angle to the feather position. Typically, feathering is accomplished through electronic control 16 via a discrete input. However, if control 16 malfunctions, a pilot can override it and feather can be independently accomplished through feather solenoid 26. In this manner, metered pressure $P_M$ from line $L_{3,2}$ is rapidly drained from protection valve 24 as hydraulic pressure $P_C$ causing valve 24 to shuttle to the fully protected position. Full supply pressure $P_S$ is then applied from protection valve 24 as pressure $P_C$ through line $L_2$ to the coarse pitch side of actuator piston 33, and the fine pitch side is ported to drain through line $L_1$, resulting in a blade angle slew rate toward feather.

Additional elements of the system include main pump 70, preferably in the form of a positive displacement gear type pump readily available in the art, which functions to provide hydraulic power required for normal pitch change operation to the actuator 34, as is known in the art. Auxiliary pump 72 is also provided for backing up the main pump in case of failure thereof. The auxiliary pump preferably includes a check valve 86 for preventing back flow from portion 18 or main pump 70 and also a pressure relief 84 for preventing the generation of hydraulic pressure in excess of the pump capacity.

Further elements of system 10 include power lever angle measuring system 74 in the form of an RVDT, which also decreases system volume, which system 74 functions to provide control 16 with an electrical signal indicative of power lever angle in the cockpit. Finally, a pair of condition levers 76 are provided as idle points for linkages in the nacelle which connect a condition lever in the aircraft cockpit with a fuel shutoff lever on the engine mechanical fuel control (not shown).

In operation, electronic control 16 is the primary system for controlling blade angle of blades 12 by commanding electrohydraulic valve 20 to direct hydraulic pressure $P_C$, $P_F$ through lines $L_2$ and $L_1$ to transfer tube 36 and actuator 34. Accordingly, under normal operation, protection valve 24 is preferably aligned for flow therethrough of hydraulic pressure from valve 20, through lines $L_1$ and $L_2$. In this manner, transfer bearing 68 transmits the coarse and fine pitch hydraulic pressure $P_C$, $P_F$ from electrohydraulic flow valve 20. During normal usage, the RVDT type beta angle feedback sensing system 30 provides continual information to the electronic control 16, constantly updating the blade angle of blades 12.

In the event that a malfunction in the electronic propeller control 16 results in an overspeed condition, or another condition such as test implementation and manual override, backup system overrides control 16 and assumes blade pitch control. In this situation, overspeed governor 32 is operative to shift protection valve 24, via lines $L_{3,1}$ and the draining of pressure $P_M$ to cause actuator 34 to receive pressure $P_C$ and adjust the blade angle of blade 12, for ending overspeed conditions. In addition to overspeed, if a malfunction in control 16 results in an inadvertent command of blade angle below the minimum in-flight blade angle, or another condition such as test or manual override arises, the secondary low pitch stop system, as described above, is caused to override control 16 and ultimately maintain blade angle above the minimum value, stabilizing the blades through the metering of pressure $P_M$ from valve 24 through lines $L_3$, $L_{3,3}$ for coarse blade angle adjustment. Accordingly through protection valve 24 and a combination of lines $L_{3,1}$, $L_{3,3}$, $L_3$, when either the overspeed governor 32 or the secondary low pitch stop system 28 are involved, protection valve 24 is shifted to a protection position which blocks flow from valve 20 to the transfer tube 36 and actuator 34. In this manner, flow through lines $L_{3,1}$, $L_3$, $L_{3,3}$ is used for porting pressure $P_C$ to the coarse side of actuator piston 33, while the fine side pressure $P_F$ is drained. Accordingly, blade angle is stabilized toward high pitch via actuator 34 driven by backups, governor 32 and low pitch stop system 28.

As indicated, control 16 may be overridden by backup system 25, specifically low pitch stop system 28, for testing of the backups prior to flight. Control 16 also has the ability to perform its own test on low pitch stop system 28 prior to flight by finely adjusting blade angle until the low pitch stop is activated By receiving feedback from system 30 as to blade angle at the time of activation of low pitch stop system 28, control 16 can determine if the low pitch stop system is activating at the proper blade angle.

In addition to the overspeed governor and low pitch stop system backups, feather solenoid 26 may be manually invoked for emergency feather, thereby overriding control 16 and electrohydraulic valve 20. Accordingly, with the malfunction of control 16 and other conditions which may require the propeller to go to feather, control 16 is manually overridden by the pilot via feather solenoid 26 to change the blade angles of blades 12 in the full coarse direction to feather. In this scenario, protection valve 24 is again moved to the protective position whereby flow from valve 20 is cut off, thereby cutting off system 16. Hydraulic pressure $P_M$ is drained from the protection valve 24 through line $L_{3,2}$ and supply pressure $P_s$ is ported to line $L_2$ to the coarse side of the actuator piston 33 for allowing rapid high pitch adjustment. When feather solenoid 26 is relieved of control, control 16 will begin an unfeathering sequence during which the system will limit blade pitch angle decrease until the RPM of the blades nears the selected governing RPM.

The primary advantage of this invention is that an improved electronic propeller control system is provided having a simplified backup system for monitoring, controlling and changing the propeller blade angles. Another advantage of this invention is that an electronic propeller control system is provided with a backup system for use with counterweighted type propeller blades wherein the system includes a single simplified protection valve which is operative to control various backup system features. Still another advantage of this invention that an electronic propeller control system is that having a backup system wherein the control system in the form of a lighter and lower cost hydromechanical unit. And yet another advantage of this invention is that an electronic propeller control system is provided having a backup, system wherein the control system includes means for automatically checking the functionality of the backup system.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

I claim:

1. A system for controlling functions of a propeller having a plurality of blades, comprising:

electronic control means for controlling said functions of said propeller;

a plurality of backup means for backing up said electronic control means upon the occurrence of a condition including at least one of testing, manual override, and a malfunction in said electronic control means;

means for bypassing said electronic control upon the occurrence of said condition and for invoking at least one of said plurality of backup means to acquire control over at least one of said functions; and means for actuating said means for bypassing upon the sensing of at least one of the conditions, wherein said at least one of said functions is blade angle of said blades, further including means for measuring values of said blade angle and communicating said values to said electronic control means, wherein if said values are determined to be incompatible with flight requirements, said at least one of said plurality of backup means is invoked, wherein said blades of said propeller have in-flight blade angles including a minimum in-flight blade angle and a desired in-flight blade angle, wherein one of said conditions comprises said in-flight blade angle falling below said minimum blade angle, wherein said at least one of said plurality of backup means comprises a low pitch stop mechanism for stopping said blade angle from falling further below said minimum blade angle and for returning said blade angle to said desired in flight blade angle, and wherein said electronic control means includes means for reversing said blades and for testing said low pitch stop mechanism.

2. The system according to claim 1, further including means for actuating change in said blade angle, wherein said means for measuring comprises a rotary variable differential transformer (RVDT) adapted to determine blade angle from movement of said means for actuating.

3. The system according to claim 1, further including means for actuating change in said blade angle, wherein said electronic control means is adapted to send signals to said means for actuating for invoking said means for actuating, wherein said means for bypassing is a single protection valve adapted to cut off said signals from said electronic control means to said means for bypassing, said single protection valve further adapted to invoke each of said plurality of backup means as required by said conditions.

4. The system according to claim 3, wherein said blades of said propeller have a minimum in-flight blade angle, and wherein said plurality of backup means comprise means for controlling overspeed and at least one of means for feathering said blades and means for preventing said blades from violating a minimum in-flight blade angle.

5. The system according to claim 4, wherein said means for controlling overspeed comprises an overspeed governor, said means for feathering comprises a feather solenoid, and said means for preventing comprises a low pitch stop valve mechanism.

6. The system according to claim 4, further including valve means for controlling said means for actuating in response to said electronic control means, wherein said single protection valve is adapted to be in fluid communication with each of said valve means, said means for controlling over speed, said means for feathering, and said means for preventing for forwarding control signals to said means for actuating for achieving blade angle.

7. The system according to claim 6, wherein said single protection valve includes means for shuttling between said valve means, said means for controlling, said means for feathering, and said means for preventing and means for receiving signals from a discrete source and said electronic control means for actuating said means for shuttling to engage one of said valve means, said means for controlling, said means for feathering, and said means for preventing in response to said condition.

8. The system according to claim 7, wherein said means for actuating includes a coarse pitch actuation mechanism and a fine pitch actuation mechanism, said single protection valve further including means for porting an actuating fluid to at least one of said coarse and fine pitch actuation mechanisms for achieving said fluid communication with at least one of coarse and fine blade angle adjustment on command by one of said valve means, said means for controlling, said means for feathering, and said means for preventing.

9. The system according to claim 8, wherein said means for porting comprise a plurality of channels within said single protection valve, wherein each of said means for controlling, said means for feathering, and said means for preventing are adapted to command said actuating fluid to be ported through said channels to said coarse pitch actuation mechanism for achieving coarse blade angle adjustment and said valve means is adapted command said actuating fluid to be ported through said channels to each of said coarse and fine pitch actuation mechanisms for achieving coarse and fine blade angle adjustment.

10. The system according to claim 1, wherein said low pitch stop mechanism comprises a solenoid having a normally open and a closed position.

11. The system according to claim 10, further including means for activating said closed position independent of said electronic control means.

* * * * *